United States Patent [19]

Junk

[11] Patent Number: 5,735,198
[45] Date of Patent: Apr. 7, 1998

[54] ROLLER BEARING APPARATUS

[75] Inventor: Dieter Junk, Kreuztal, Germany

[73] Assignee: Voith Sulzer Finishing GmbH, Krefeld, Germany

[21] Appl. No.: 677,572

[22] Filed: Jul. 8, 1996

[30] Foreign Application Priority Data

Jul. 7, 1995 [DE] Germany ............. 195 24 747.7

[51] Int. Cl.[6] ................................................ B30B 3/04
[52] U.S. Cl. ........................... 100/170; 100/172; 72/245
[58] Field of Search ................ 100/162 R, 163 R, 100/163 A, 168–170, 172; 72/245

[56] References Cited

U.S. PATENT DOCUMENTS

| 666,700 | 1/1901 | Savery | 100/168 |
|---|---|---|---|
| 1,818,719 | 8/1931 | Kutter | 100/170 |
| 2,638,819 | 5/1953 | Hornbostel | 100/163 R |
| 3,183,826 | 5/1965 | Moore et al. | 100/163 R |
| 3,543,555 | 12/1970 | Baumann et al. | 72/245 |
| 4,986,177 | 1/1991 | Masek . | |

FOREIGN PATENT DOCUMENTS

| 203109 | 10/1908 | Germany | 100/169 |
|---|---|---|---|
| 237082 | 7/1911 | Germany | 100/170 |
| 2321053 | 10/1974 | Germany | 100/170 |
| 23 20 518 | 3/1975 | Germany . | |
| 29 29 942 | 4/1982 | Germany . | |
| 83 13 265 U | 7/1984 | Germany . | |
| 36 10 107 | 1/1991 | Germany . | |
| 39 00 858 | 9/1992 | Germany . | |
| 44 34 509 | 4/1995 | Germany . | |
| 61-241516 | 10/1986 | Japan . | |
| 89/01572 | 2/1989 | WIPO . | |

Primary Examiner—Stephen F. Gerrity
Attorney, Agent, or Firm—Darby & Darby

[57] ABSTRACT

A roller bearing apparatus for supporting a compensation roller that is disposed adjacent to a roller of a roller stack. The compensation roller has an axis. The roller stack has an axis. A plane is defined by the compensation roller axis and the roller stack roller axis. A bearing support is disposed in a frame. The bearing support receives a ball joint. The bearing support is movable relative to the frame to act as a lever. The bearing support pivots about a pivot point. A pressure transducer is disposed between the frame and the bearing support. The pressure transducer acts in a direction that is disposed exterior to the ball joint. The pressure transducer extends on both sides of the plane and acts perpendicularly to the plane.

22 Claims, 4 Drawing Sheets

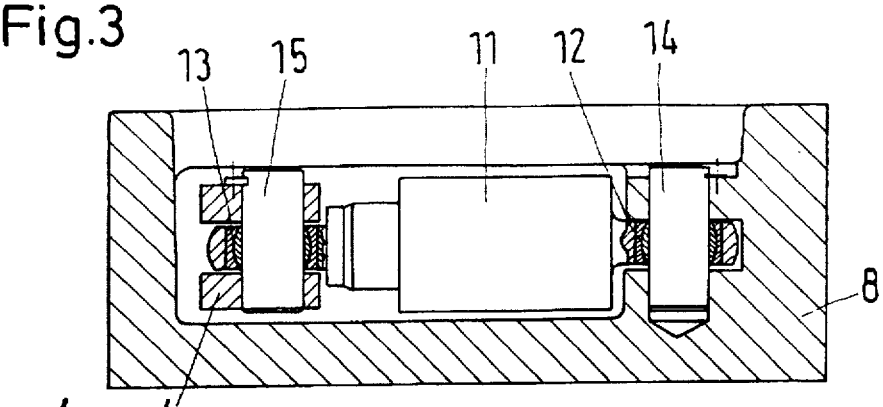
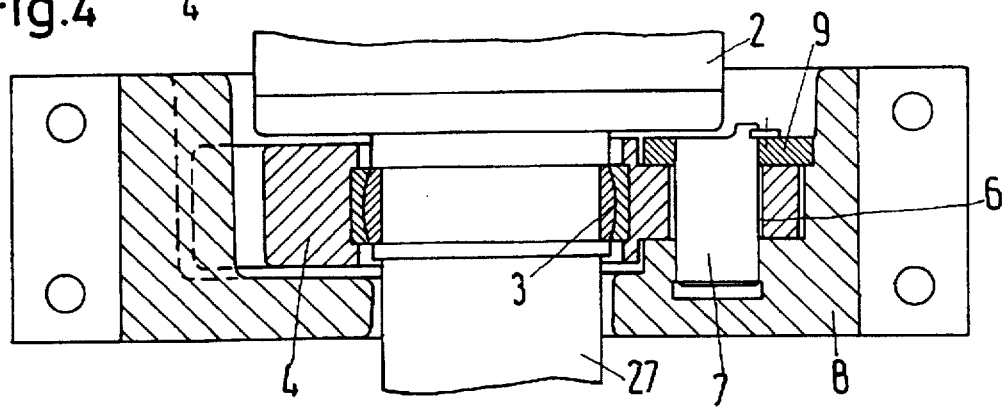
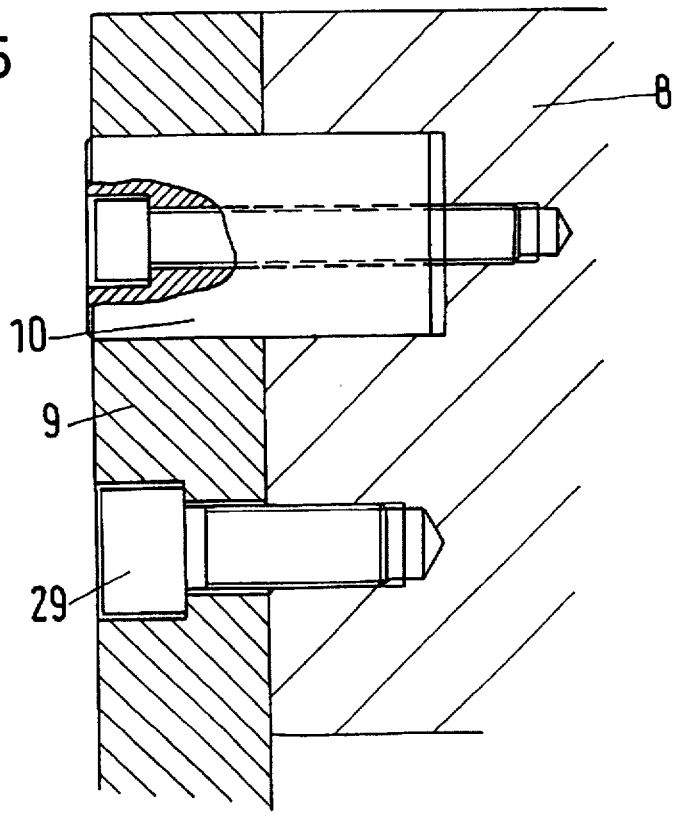

ROLLER BEARING APPARATUS

BACKGROUND OF THE INVENTION

1. Field of the Invention

The present invention relates to a bearing apparatus. More specifically, the present invention relates to a bearing apparatus used to support a compensation roller in a calender. The roller bearing apparatus has a frame within which is disposed a bearing support to receive a ball joint. The bearing support moves relative to the frame and acts as a lever. The bearing support pivots about a pivot point that is preferably at the center point of the bearing pin. A pressure transducer is disposed between the frame and the bearing support. The pressure transducer acts in a direction that is disposed exterior to the ball joint.

2. Discussion of the Related Art

German Reference No. DE 23 20 518 B2 discloses a roller bearing apparatus for a lever calender which has a number of rollers disposed one above the other. The lowermost roller is mounted in a lever, whose pivot point is fastened to a frame. The other side of the lever can have a force applied to it by means of a pressure transducer. When the pressure transducer is activated, the lowermost roller is raised so that pressure can be applied to the roller gap disposed between the individual rollers. When the pressure transducer is relieved, the roller gaps open. The pressure transducer acts in a direction that is parallel to a plane which contains all of the axes of the rollers.

U.S. Pat. No. 4,986,177 discloses an arrangement that, in principle, corresponds to the lever calender disclosed in the German '518 reference. The pressure transducer in the '177 patent is an air cushion that is operated with the use of compressed air.

German Reference No. DE 44 34 509 A1 discloses another lever calender. The lower rollers in this lever calender are mounted on angled levers. The levers pivot about pivot points in a frame. A force can be applied to each lever by means of a pressure transducer. The pressure transducer acts in a direction that is at a slight angle relative to the plane which contains the two rollers which form the respective roller gap.

Another lever calender is known from PCT reference WO 89/01572. The lower roller in this apparatus is fastened to a lever. One of the sides of the lever is fastened to a frame, while the other side of the lever can be acted upon by a force from a pressure transducer. The center point of the lower roller is disposed in the middle of the lever. The pressure transducer acts in a direction that is parallel to the plane 36 which contains the axes of the rollers.

All these lever calenders require considerable space to permit the use of a pressure transducer. Typically, the pressure transducer is disposed below the lever and the roller stack is disposed above the lever. Only a limited space is available for the pressure transducer. Therefore, the pressure transducer must be specially designed so that it is sufficiently small so as not to excessively increase the structural size of the roller bearing apparatus.

German Reference No. DE 29 29 942 C3 discloses a roller bearing apparatus, which has a rather large bore. The bore acts as a cylinder and is disposed in the frame above and below the bearing support. A piston, which acts as a guide, is inserted into this bore. The piston acts as a pressure transducer, and can operate in two directions (i.e., the piston can move the bearing support both up and down).

This type of roller bearing apparatus permits the use of favorable dimensions for the rollers because one can chose the smallest possible diameter for the rollers. This is especially true for the bending adjustment compensation roller. Thus, a relatively good line-load profile can be achieved. Furthermore, a relatively rapid separation of the rollers can be achieved with this design. The force flux remains within the frame, and therefore does not stress the foundation. The height and width of the structure can be kept small. In some embodiments, the roller, together with its bearing apparatus, can be removed from the roller stack.

However, this type of roller bearing apparatus also has some considerable disadvantages. For example, the pressure transducer is very expensive to produce. Furthermore, the guidance friction can be relatively large if the opposing piston guides are not completely aligned. Additionally, bending moments can result from the drive-based tangential forces disposed in the roller gap. These bending moments result in wear on the piston guide. Further, relatively little space is available adjacent to the pressure transducers. Consequently, the pressure transducers must be designed to be very compact while still being very powerful. Of course, such a contradiction in design parameters makes these pressure transducers even more expensive to build. Finally, maintenance is relatively expensive due to the load applied by the pressure transducer.

German Reference No. DE 36 10 107 C2 provides another attempted solution. This roller bearing mounts the complete frame by means of pressure transducers. The frame is guided in a vertical guide, one of whose sides is fastened on a foundation while the other side receives the pressure transducers. This proposed design is also relatively expensive to produce.

SUMMARY OF THE INVENTION

It is an object of the present invention to permit greater freedom in choosing the pressure transducer, without excessively increasing the construction size.

This object is achieved with a roller bearing apparatus, where the pressure transducer extends on both sides of a plane that contains the roller axis and a counter-roller axis, and acts perpendicularly to this plane.

With this design, it is possible to increase the space available for the pressure transducer without significantly increasing the construction space of the roller bearing apparatus as a whole. The outside dimensions of the roller bearing apparatus can essentially remain the same as compared to known roller bearing apparati. Such a space savings can be achieved because the lever is now acting perpendicularly to the plane in which the roller axes are disposed. Accordingly, the pressure transducer is also disposed perpendicularly to this plane. In this arrangement, the force from the hydraulic cylinder must be deflected so that it can be applied to the compensation roller. Consequently, one end of the pressure transducer is fastened to the frame on one side of the plane and the other end of the pressure transducer is fastened to the lever.

If the exterior dimensions of the frame remain unchanged, the space available for the pressure transducer is practically doubled with the construction according to the present invention. In practice, the length that is actually available for the pressure transducer corresponds to the diameter of the compensation roller. Further, because the bearing support is designed as a lever, no linear guide is needed. Deviations from alignment have a much smaller effect on wear than is the case with linear guides. Thus, the present invention obtains the advantages that are known from a lever calender, in combination with the compact dimensions of a roller bearing apparatus. The apparatus can be manufactured economically. By using the lever, it is no longer necessary for the pressure transducer to act in the press direction, that is in a plane containing the roller axes. Consequently, a location can be chosen for the pressure transducer where sufficient space is available to permit the pressure transducer to be attached and operational. By using a lever, which has a lever multiplication ratio of at least 2.5, a relatively weak transducer force can be transferred into a relatively strong force applied by the compensation roller against, for example, the counter-roller. Thus, the pressure transducer can be made correspondingly smaller, but with a correspondingly greater operating length. However, because the hydraulic cylinder extends on both sides of the plane containing the rollers axes, a site for its attachment that has a correspondingly large space is available.

The pivot point of the bearing support is disposed at the center of a bearing pin. When the lever pivots about the pivot point, the resulting motion is always a circular arc, not linear motion. However, the range of angular movement which the lever executes when displacing the ball joint type of roller bearing is relatively small. If the pivot point is essentially disposed at a right angle with respect to the press direction, the small angle of motion permits the assumption that the movement of the roller bearing itself is linear because, as is well known in the field of the mathematics, for small angles, the sine of an angle corresponds to the angle itself.

The ball joint is movable essentially in a linear press direction that is parallel to the plane. The pivot point and a center point of the ball joint define a line that is essentially perpendicular to the press direction. To house the pressure transducer, a space is available within the frame whose length corresponds to the diameter of the roller. This dimension is so large that the choice of pressure transducer is relatively open to those that are commercially available without requiring any special modification. Consequently, one can use standard parts such as those that are generally available on the market in relatively large numbers. These parts consequently are inexpensive and in many cases at least as reliable or even more reliable than specially made or one of a kind products. The height space required for the pressure transducer corresponds only to its diameter, and is therefore relatively small, so that the structural space remains small.

The pivot point is preferably formed by a bearing pin, which is received in the frame and in an adapter plate that is fastened to the frame. The frame and the adapter plate receive the lever at least in an area adjacent to the pivot point. The bearing pin is therefore supported in its axial direction on both sides of the lever and can therefore absorb large forces. The roller bearing apparatus is correspondingly powerful. Because an adapter plate connected to the frame is provided, production is relatively simple.

The adapter plate is preferably secured to the frame by means of a shearing pin so that the frame and adapter plate will be fitted together exactly. Thus, the risk of tilting the bearing pin and thus contributing to greater friction is relatively low.

The pressure transducer is preferably disposed substantially parallel to an edge of the frame. The pressure transducer is disposed adjacent to this edge to facilitate assembly and maintenance of the pressure transducer.

The pressure transducer is disposed substantially parallel to and adjacent to an edge of the frame. This arrangement provides a relatively large lever, so that the pressure transducer can be dimensioned correspondingly weaker (i.e., smaller).

The pressure transducer is preferably connected to at least one of the frame and the lever by a second ball joint. The wear, which would otherwise result from a slight misalignment, is thus minimized.

The bearing support includes a cover. The bearing support and the cover together enclose the ball joint. The use of a cover makes it possible to assemble and disassemble the roller bearing easily to and from the compensation roller. After the cover has been removed, the compensation roller can be removed by removing the roller journal from the lever.

The compensation roller and a plug-in drive are received in the bearing support. A drive shaft of the plug-in drive extends exterior to the frame. Such a plug-in drive can be implemented, for example, by a belt drive. The plug-in drive drives at least a jacket of the compensation roller. If the drive shaft passes through to the outside of the frame, the drive can also be powered from outside the frame.

The drive shaft is detachably connected to a hollow pinion of the plug-in drive. However, even if the drive member is connected, it is relatively easy to disassemble the compensation roller from the roller bearing apparatus.

The frame preferably has an open forked cut-out. After the cover has been removed, the compensation roller can be lifted out through the open fork cut-out to permit relatively rapid removal and installation of the roller in the roller bearing apparatus. Conventionally, to remove and install the roller in the roller bearing apparatus, one must normally place the roller down on its ball edges or slip shoulders so that the bearing apparatus can be pulled off in the axial direction. When a cover is used, it is also required that the cover be detached prior to removal of the roller from the frame. If a forked cut-out is present, the repositioning step is no longer necessary. For example, one can lift the roller off the roller bearing apparatus by means of a traveling crane, even if the crane is disposed on a removal car. Another advantage of the lever according to the present invention, is that the lever is fastened on the frame and the pressure transducer is fastened to the lever and from outside of the center plane of the frame. As a result, any material disposed in the region of the roller journal (i.e., in the center plane of the frame) can be removed without impairing the bearing.

The forked cut-out preferably has a reinforcement collar. This reinforcement collar permits the frame to be stressed appropriately, for example, by the bearing pin, even if the material from the fork cut-out can no longer be used for support.

The frame preferably has a centering groove on its under side, to guide the movement of a removal and installation car with respect to the frame.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 3 is a cross-sectional view taken along lines 3—3 of FIG. 1 and looking in the direction of the arrows;

FIG. 4 is a cross-sectional view taken along lines 4—4 of FIG. 1 and looking in the direction of the arrows;

FIG. 5 is a cross-sectional view taken along lines 5—5 of FIG. 1 and looking in the direction of the arrows.

DETAILED DESCRIPTION OF THE PREFERRED EMBODIMENT

Figure 1:
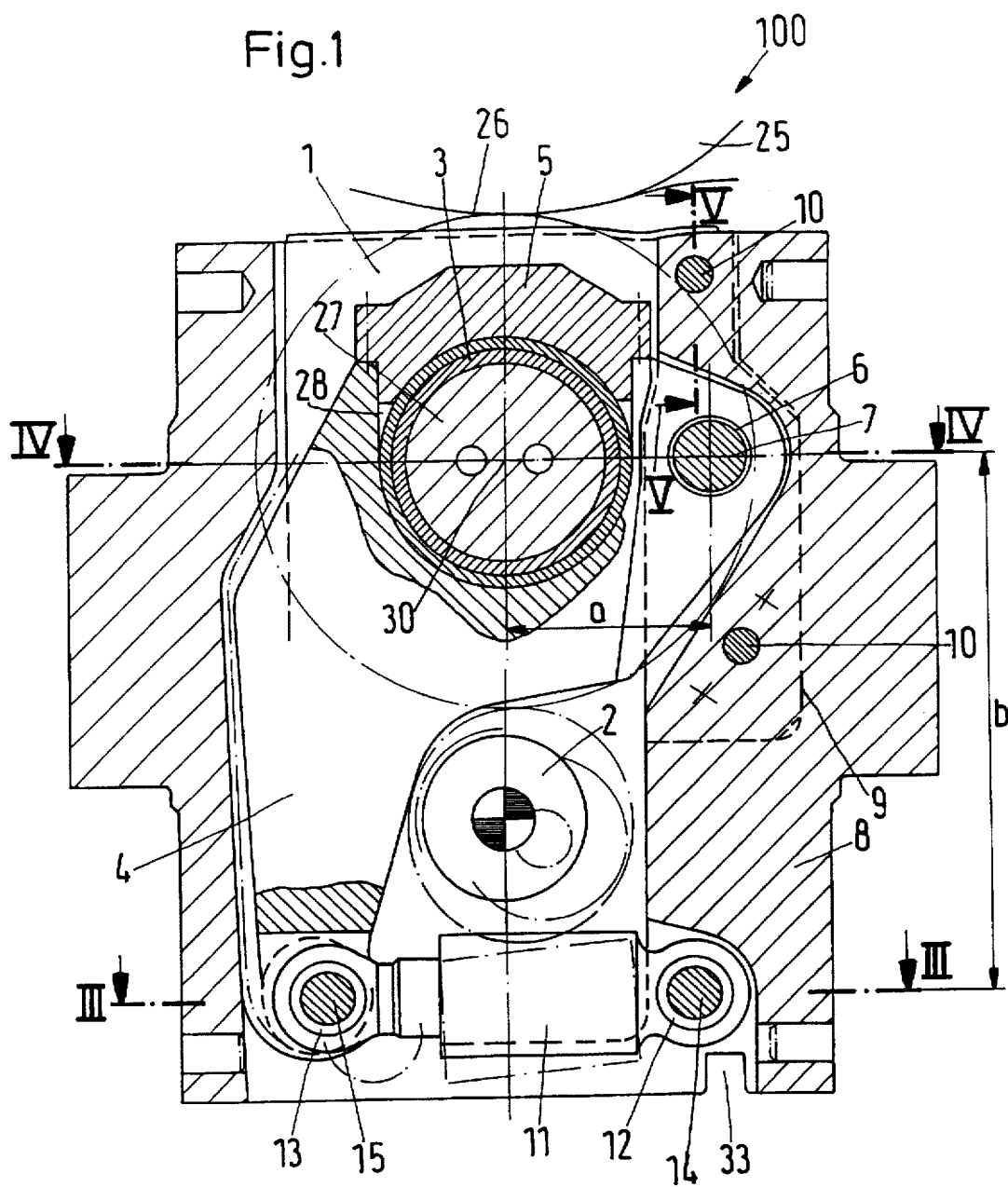
FIG. 1 is a schematic cross-sectional view, with parts broken away, of a roller bearing apparatus.

Referring now to FIG. 1, a roller bearing apparatus 100 for a compensation roller 1 is illustrated. Compensation roller 1 is also known as a bending adjustment roller. Compensation roller 1 together with a counter-roller 25 form a roller gap 26 therebetween. Counter-roller 25 is preferably the lowermost roller of a roller stack of a convention calender. The use of a compensation roller to support the roller stack of a calender is, per sé, known. A roller journal 27 is disposed at each axial end of the roller 1 (only one journal is shown). Compensation roller 1 has a plug-in drive 2 disposed below compensation roller 1. In other words, with respect to compensation roller 1, plug-in drive 2 is disposed substation opposite to counter-roller 25.

Roller journal 27 is secured in a bearing support 4 via a ball joint 3. The bearing support 4 is designed as a lever. Lever 4 has a "U"-shaped recess 28 to receive the roller journal 27. Recess 28 is closed by a cover 5.

Lever 4 is pivotably mounted in a frame 8, about a pivot point, which is formed by a bearing pin 7 and a bearing bushing 6. As illustrated in FIG. 4, the bearing pin 7 is mounted, on one side, in frame 8 and, on the other side, in an adapter plate 9. The bearing pin 7 is thus supported at its two axial ends. The adapter plate 9 is shown in dashed lines in FIG. 1. Adapter plate 9 is fastened to frame 8, with threaded fasteners 29 and with shearing pins 10 (see FIG. 5). Adapter plate 9 lies flush against frame 8. Adapter plate 9 has a recess to receive lever 4 disposed between the frame 8 and the adapter plate 9. This recess is disposed only in the area adjacent to bearing pin 7 to provide a small guide that is parallel to the direction of motion of roller 1.

As illustrated in FIG. 1, a hydraulic cylinder 11 is disposed between frame 8 and the lower portion of lever 4. Hydraulic cylinder 11 is disposed in the area of the edge of the frame 8, which is most remote from the bearing pin 7. Accordingly, a relatively large lever arm b (i.e., the distance between pivot point 7 and the point where the hydraulic cylinder 11 contacts the lever 4) is achieved.

Hydraulic cylinder 11 is pivotably connected, via ball joints 12, 13 and bearing pins 14, 15, to frame 8 and lever 4, respectively (See FIG. 3). Ball joints 12, 13 prevent bending moments from being applied in the area of the lever bearing, such as could occur from production inaccuracies. The ball joints also compensate for alignment errors.

The center point of bearing pin 7 and the center point 30 of roller journal 27 define a straight line therebetween. Thus, the same straight line is defined between the center of the compensation roller 1 and the center point of the bearing pin 7. This line is disposed perpendicularly to a line that connects the center of the compensation roller 1 and the center of the counter-roller 25. The distance between the center point 30 of the compensation roller 1 and the center point of the bearing pin 7 defines a lever length a. Because the distance b from the hydraulic cylinder 11 to the bearing pin 7 is so large, a lever multiplication ratio of b/a=2.5 or more can be assured. Even if the hydraulic cylinder 11 is relatively weak, it is possible to achieve a large contact-pressure force of the compensation roller 1 against the counter-roller 25 because of the lever ratio b/a.

Because the hydraulic cylinder 11 is disposed in the area of the lower edge of the frame 8, the cylinder 11 is readily accessible for maintenance purposes.

When hydraulic cylinder 11 is activated, lever 4 moves from the position shown in solid lines into a position shown in dash-dot lines in FIG. 1. The compensation roller 1 thus pivots upward about the bearing journal 7. Because the angular motion of lever 4 that is caused by actuation of cylinder 11 is so small, the upward movement of compensation roller 1 can be considered, for practical purposes, to be linear.

Figure 2:
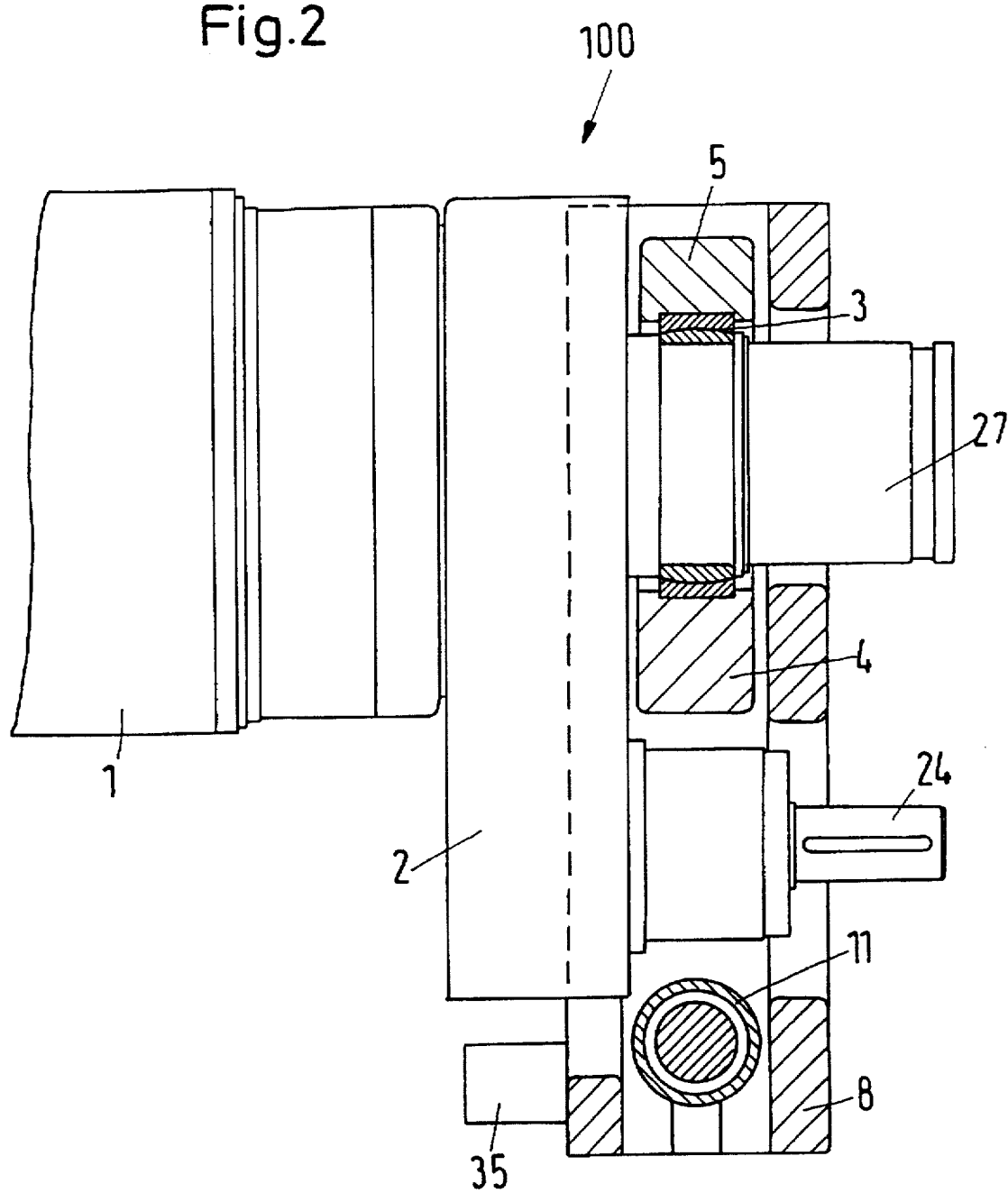
FIG. 2 is a schematic partial longitudinal sectional view of a roller bearing apparatus.

Because of the substantially horizontal arrangement of the hydraulic cylinder 11, or more precisely, the fact that the axis of hydraulic cylinder 11 is disposed perpendicular to the press direction (that is the direction between the two center points of the compensation roller 1 and the counter-roller 25), sufficient space is available for the plug-in drive 2, including accessibility for an input shaft 24. FIG. 2 shows plug-in drive 2 using a belt to drive the compensation roller 1. Using this type of drive has the disadvantage that a relatively large amount of space is required, especially to accommodate the drive journal, which, of course, hinders the installation and removal of the compensation roller 1 into and from the bearing housings. The compensation roller 1 is generally installed and removed by placing the compensation roller on its ball edges or slip shoulders, and then, after loosening the cover 5, frame 8 is removed from the roller.

Figure 6:
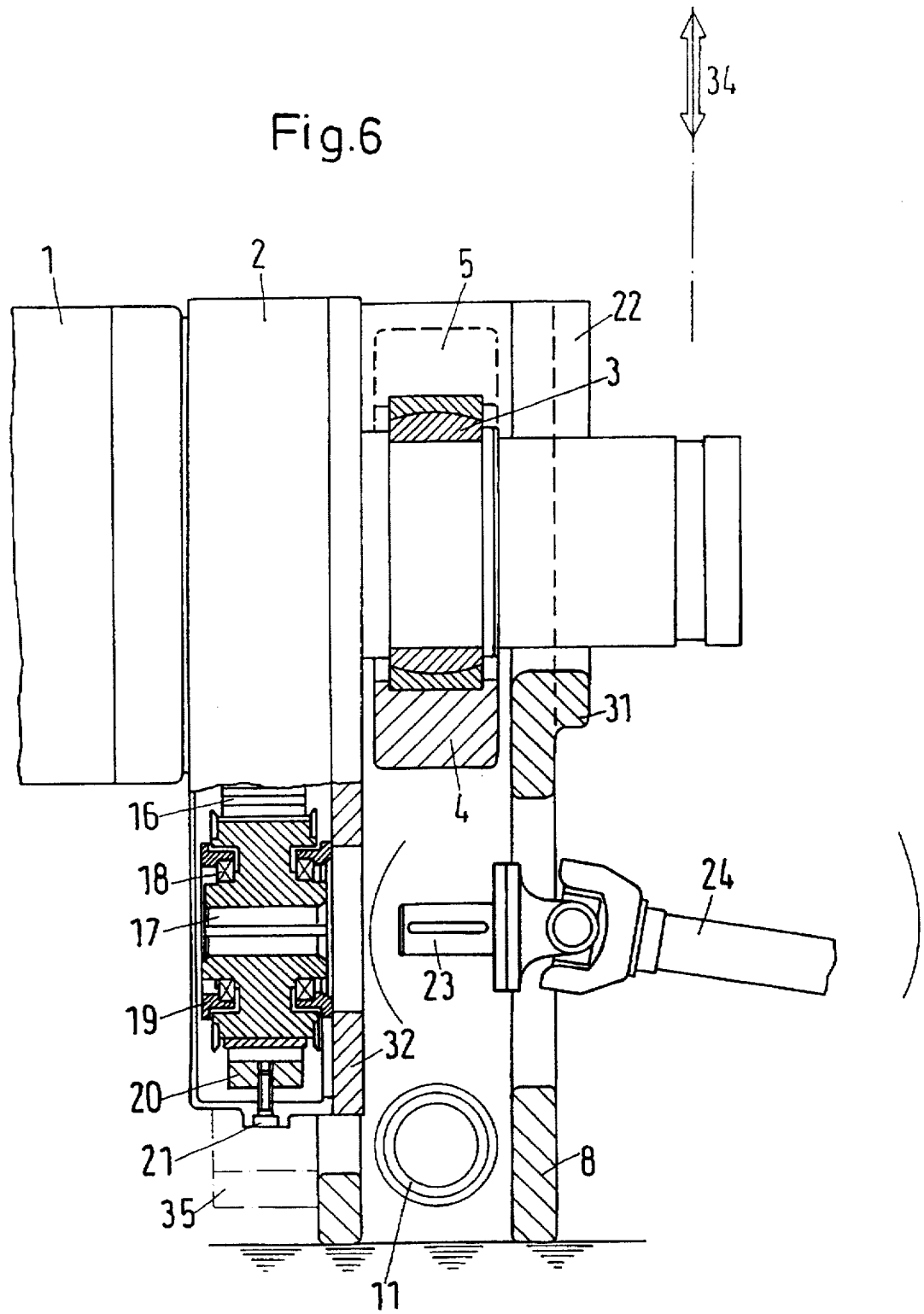
FIG. 6 is a schematic partial longitudinal sectional view of another embodiment according to the present invention.

An alternative embodiment of the present invention, which has improved disassembly features, is shown in FIG. 6. Frame 8 has a forked cut-out 22, which is surrounded by a reinforcement collar 31.

FIG. 6 schematically shows the internal structure of the belt-driven plug-in transmission 2. The belt-driven plug-in transmission 2 includes a toothed belt 16, which mates with the gear teeth of a pinion 17. Pinion 17 is rotatably mounted in a fork 20. Fork 20 can be positioned and fastened against a base part 32 by means of an adjusting screw 21. Bearings 18 are fastened on fork 20 via bearing shields 19. Bearing shields 19 can be flanged onto the fork 20 outside the pinion diameter.

The input shaft 24 has a drive journal 23, which is insertable into pinion 17. Pinion 17 is hollow so that it may receive drive journal 23. After the drive connection has been disconnected, drive journal 23 and input shaft 24 can be placed exterior to frame 8. Depending on the construction size, an automatic coupling and decoupling of the drive can also be implemented. A torque support 35 for the plug-in transmission 2 is connected to frame 8.

If a complete roller is removed from a roller stack, for example, by an installation and removal car, this complete roller can be centered relative to the roller bearing apparatus 100 by means of a centering groove 33 (FIG. 1). After the drive journal 23 has been removed and cover 5 has been loosened, the complete roller can be removed upwardly from the roller bearing apparatus 100, in the direction of arrow 34. In similar fashion, the roller can be lowered into the roller bearing apparatus 100, so as to be mounted in the roller bearing apparatus 100. Accordingly, the replacement of a roller can be accomplished relatively quickly, and, in some circumstances, can be achieved without stocking reserve bearings.

Having described the presently preferred exemplary embodiment of a roller bearing apparatus in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A roller bearing apparatus for supporting a compensation roller that is disposed adjacent to a roller of a roller stack, said compensation roller having an axis, said roller stack having an axis, a plane being defined by said compensation roller axis and said roller stack roller axis, said roller bearing apparatus comprising:

a frame;

a bearing support disposed in said frame, said bearing support receiving a ball joint, said bearing support being movable relative to said frame to act as a lever, said bearing support pivoting about a pivot point, said ball joint being movable essentially in a linear press direction that is parallel to said plane, said pivot point and a center point of said ball joint defining a line that is essentially perpendicular to said press direction;

a pressure transducer disposed between said frame and said bearing support, said pressure transducer acting in a direction that is disposed exterior to said ball joint, said pressure transducer extending on both sides of said plane, said pressure transducer acting substantially perpendicularly to said plane.

2. The apparatus according to claim 1, further comprising a bearing pin being received in said frame, said pivot point of said bearing support is disposed at a center of said bearing pin.

3. The apparatus according to claim 1, wherein said pressure transducer acts in a direction that is essentially perpendicular to a direction of movement of said ball joint.

4. The apparatus according to claim 1, wherein said pivot point is formed by a bearing pin, said bearing pin being received in said frame and in an adapter plate fastened to said frame, said adapter plate receiving said bearing support at least in an area adjacent to said pivot point.

5. The apparatus according to claim 4, wherein said adapter plate is secured to said frame with a shearing pin.

6. The apparatus according to claim 1, wherein said pressure transducer is disposed substantially parallel to an edge of said frame and adjacent to said edge.

7. The apparatus according to claim 6, wherein said edge of said frame is disposed at a portion of said frame that is most remote from said pivot point.

8. The apparatus according to claim 1, wherein said pressure transducer is connected to at least one of said frame and said bearing support by at least a second ball joint.

9. The apparatus according to claim 1, wherein said bearing support includes a cover, said bearing support and said cover together enclose said ball joint.

10. The apparatus according to claim 1, wherein said compensation roller and a plug-in drive are received in said bearing support and a drive shaft of said plug-in drive extends exterior to said frame.

11. The apparatus according to claim 10, wherein said drive shaft is detachably connected to a hollow pinion of said plug-in drive.

12. The apparatus according to claim 10, wherein said frame has an open forked cut-out.

13. The apparatus according to claim 12, wherein said forked cut-out includes a reinforcement collar.

14. The apparatus according claim 1, wherein said frame includes a centering groove on a side remote from said roller stack roller.

15. A roller bearing apparatus for supporting a compensation roller that is disposed adjacent to a roller of a roller stack, said compensation roller having an axis, said roller stack having an axis, a plane being defined by said compensation roller axis and said roller stack roller axis, said roller bearing apparatus comprising:

a frame;

a bearing support disposed in said frame, said bearing support receiving a ball joint, said bearing support being movable relative to said frame to act as a lever, said bearing support pivoting about a pivot point;

a pressure transducer disposed between said frame and said bearing support, said pressure transducer acting in a direction that is disposed exterior to said ball joint, said pressure transducer extending on both sides of said plane, said pressure transducer acting substantially perpendicularly to said plane;

wherein said pivot point is formed by a bearing pin, said bearing pin being received in said frame and in an adapter plate fastened to said frame, said adapter plate receiving said bearing support at least in an area adjacent to said pivot point.

16. The apparatus according to claim 15, wherein said adapter plate is secured to said frame with a shearing pin.

17. A roller bearing apparatus for supporting a compensation roller that is disposed adjacent to a roller of a roller stack, said compensation roller having an axis, said roller stack having an axis, a plane being defined by said compensation roller axis and said roller stack roller axis, said roller bearing apparatus comprising:

a frame;

a bearing support disposed in said frame, said bearing support receiving a ball joint, said bearing support being movable relative to said frame to act as a lever, said bearing support pivoting about a pivot point;

a pressure transducer disposed between said frame and said bearing support, said pressure transducer acting in a direction that is disposed exterior to said ball joint, said pressure transducer extending on both sides of said plane, said pressure transducer acting substantially perpendicularly to said plane;

wherein said bearing support includes a cover, said bearing support and said cover together enclose said ball joint.

18. A roller bearing apparatus for supporting a compensation roller that is disposed adjacent to a roller of a roller stack, said compensation roller having an axis, said roller stack having an axis, a plane being defined by said compensation roller axis and said roller stack roller axis, said roller bearing apparatus comprising:

a frame;

a bearing support disposed in said frame, said bearing support receiving a ball joint, said bearing support being movable relative to said frame to act as a lever, said bearing support pivoting about a pivot point;

a pressure transducer disposed between said frame and said bearing support, said pressure transducer acting in a direction that is disposed exterior to said ball joint, said pressure transducer extending on both sides of said plane, said pressure transducer acting substantially perpendicularly to said plane;

wherein said compensation roller and a plug-in drive are received in said bearing support and a drive shaft of said plug-in drive extends exterior to said frame.

19. The apparatus according to claim 18, wherein said drive shaft is detachably connected to a hollow pinion of said plug-in drive.

20. The apparatus according to claim 18, wherein said frame has an open forked cut-out.

21. The apparatus according to claim 20, wherein said forked cut-out includes a reinforcement collar.

22. A roller bearing apparatus for supporting a compensation roller that is disposed adjacent to a roller of a roller stack, said compensation roller having an axis, said roller stack having an axis, a plane being defined by said compensation roller axis and said roller stack roller axis, said roller bearing apparatus comprising:

a frame;

a bearing support disposed in said frame, said bearing support receiving a ball joint, said bearing support being movable relative to said frame to act as a lever, said bearing support pivoting about a pivot point;

a pressure transducer disposed between said frame and said bearing support, said pressure transducer acting in a direction that is disposed exterior to said ball joint, said pressure transducer extending on both sides of said plane, said pressure transducer acting substantially perpendicularly to said plane;

wherein said frame includes a centering groove on a side remote from said roller stack roller.

* * * * *